United States Patent
Saito

(10) Patent No.: US 9,342,131 B2
(45) Date of Patent: May 17, 2016

(54) USB HUB AND CONTROL METHOD OF USB HUB

(75) Inventor: Shinya Saito, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 254 days.

(21) Appl. No.: 13/533,861

(22) Filed: Jun. 26, 2012

(65) Prior Publication Data

US 2013/0054866 A1 Feb. 28, 2013

(30) Foreign Application Priority Data

Aug. 30, 2011 (JP) ................................. 2011-186918

(51) Int. Cl.
*G06F 1/32* (2006.01)
*G06F 1/06* (2006.01)
*G06F 1/26* (2006.01)

(52) U.S. Cl.
CPC ................ *G06F 1/3237* (2013.01); *G06F 1/06* (2013.01); *G06F 1/266* (2013.01); *G06F 1/325* (2013.01); *G06F 1/3206* (2013.01); *Y02B 60/1221* (2013.01)

(58) Field of Classification Search
CPC ............... G06F 1/04; G06F 1/06; G06F 1/08; G06F 1/10; G06F 1/32; G06F 1/3203; G06F 1/3206; G06F 1/3215; G06F 1/3234; G06F 1/3237; G06F 1/325; G06F 13/40; G06F 13/4004; G06F 13/4027; G06F 13/4045; G06F 1/266
USPC .......... 710/306, 311, 313–314; 713/300, 320, 713/322, 324, 375, 501, 500
See application file for complete search history.

(56) References Cited

U.S. PATENT DOCUMENTS

| | | | |
|---|---|---|---|
| 6,085,325 A | 7/2000 | Jackson et al. | |
| 6,178,514 B1 * | 1/2001 | Wood | 713/300 |
| 6,363,491 B1 | 3/2002 | Endo | |
| 7,539,793 B2 | 5/2009 | Foster et al. | |
| 2004/0158750 A1 * | 8/2004 | Syed et al. | 713/320 |
| 2005/0278469 A1 * | 12/2005 | Yi | 710/301 |
| 2006/0101186 A1 * | 5/2006 | Lee | 710/313 |

(Continued)

FOREIGN PATENT DOCUMENTS

| | | |
|---|---|---|
| CN | 1444752 A | 9/2003 |
| EP | 1535170 B1 | 10/2008 |

(Continued)

OTHER PUBLICATIONS

"USB 2.0 Hub and 10/100 Ethernet Controller (LAN9512/LAN9512i)". Revision 1.0. Nov. 24, 2009. SMSC.*

(Continued)

*Primary Examiner* — Thomas J Cleary
(74) *Attorney, Agent, or Firm* — McGinn IP Law Group, PLLC

(57) ABSTRACT

A USB hub capable of reducing power consumption in a USB system. The USB hub includes an upstream USE port, a downstream USB port, a clock pin that supplies an operation clock to a USE peripheral device, and a hub controller that stops clock supply to the USB peripheral device via the clock pin when a connecting between the upstream USB port and a USB host is disconnected or when the hub controller receives a suspend request to the downstream USB port from the USB host.

19 Claims, 15 Drawing Sheets

(56) References Cited

U.S. PATENT DOCUMENTS

| | | | |
|---|---|---|---|
| 2006/0149977 A1* | 7/2006 | Cooper | 713/300 |
| 2006/0294287 A1* | 12/2006 | Motomura et al. | 710/313 |
| 2007/0006107 A1* | 1/2007 | Huang et al. | 716/6 |
| 2007/0022309 A1* | 1/2007 | Adamo et al. | 713/300 |
| 2007/0108300 A1* | 5/2007 | Son et al. | 235/492 |
| 2008/0313480 A1* | 12/2008 | Malhi et al. | 713/323 |
| 2009/0222685 A1 | 9/2009 | Foster et al. | |
| 2010/0005218 A1* | 1/2010 | Gower et al. | 711/5 |
| 2010/0162037 A1* | 6/2010 | Maule et al. | 714/5 |
| 2010/0205339 A1* | 8/2010 | Bohm | 710/106 |

FOREIGN PATENT DOCUMENTS

| | | |
|---|---|---|
| JP | H11-305880 A | 11/1999 |
| JP | 2000-183894 A | 6/2000 |
| JP | 2000-293504 A | 10/2000 |
| JP | 2001-506788 A | 5/2001 |
| JP | 2005-533305 A | 11/2005 |
| JP | 2008-052438 A | 3/2008 |
| JP | 2009-048548 A | 3/2009 |
| JP | 2009-527152 A | 7/2009 |
| JP | 2009-187258 A | 8/2009 |
| WO | WO 02/03312 A2 | 1/2002 |

OTHER PUBLICATIONS

"Universal Serial Bus Specification". Revision 2.0. Apr. 27, 2000. Compaq Computer Corporation, et al. Chapters 1, 3-4, and 7. pp. ii, 1-2, 11-24, and 119-194.*

"FS7140-01/FS7140-01g/FS7145 Programmable Phase-Locked Loop Clock Generator". Revision 3.0. 2006. AMI Semiconductor, Inc.*

SMSC, "USB 2.0 Hub and 10/100 Ethernet Controller (LAN9512/LAN9512i)", the Internet URL:http://www.smsc.com/media/Downloads_Public/Data_Sheets/9512.pdf, revision 1.1I, Sep. 19, 2011.

Intel, "Intel 5 Series Chipset and Intel 3400 Series Chipset", the Internet <URL:http://wvvw.intel.com/Assets/PDF/datasheet/322169.pdf>.

Japanese Office Action dated Feb. 3, 2015 with an English Translation thereof.

Chinese Office Action dated Jul. 3, 2015 with English Translation.

* cited by examiner

USB HUB AND CONTROL METHOD OF USB HUB

CROSS-REFERENCE TO RELATED APPLICATIONS

The disclosure of Japanese Patent Application No. 2011-186918 filed on Aug. 30, 2011 including the specification, drawings and abstract is incorporated herein by reference in its entirety.

BACKGROUND

The present invention relates to a USB hub and a control method of USB hub, in particular to a USB hub and a control method of USB hub for connecting an upstream device and a downstream device by USB.

In recent years, USB (Universal Serial Bus) is widely used as an interface that connects between electronic devices. USB can connect a host device and various peripheral devices (devices). USB is used for plug-and-play and bus power which supplies electrical power through a USB cable. Further, the transfer speed of USB is improved. Therefore, USB is used in many devices. USB is used not only between electronic devices, but also inside an electronic device. For example, an USB interface is implemented in a semiconductor integrated circuit to connect between semiconductor chips and to connect between functional blocks inside a semiconductor chip.

A USB hub, which connects between a host device and a plurality of peripheral devices in order to enable USB connecting between a host device and many peripheral devices, is known. The USB hub has a plurality of USB ports to connect to a plurality of peripheral devices, so that even when the host device has only a small number of USB ports, the host device can connect to much more peripheral devices. The USB hub includes a USB controller for controlling the USB connectings.

For example, Non-Patent Documents 1 and 2 are known as USB controllers of related art. In particular, Non-Patent Document 1 describes a hub controller that controls a USB hub. "Ethernet" is a registered trademark.

[Non-Patent Document 1]
SMSC, "USB 2.0 Hub and 10/100 Ethernet Controller (LAN9512/LAN951", the Internet <URL:http://www.smsc.com/media/Downloads_Public/Data_Sheets/9512.pdf>

[Non-Patent Document 2]
Intel, "Intel 5 Series Chipset and Intel 3400 Series Chipset", the Internet <URL:http://www.intel.com/Assets/PDF/datasheet/322169.pdf>

SUMMARY

Non-Patent Document 1 describes that a USB hub including a hub controller of the related art has a clock output terminal for supplying a clock to a peripheral device. However, a specific method of supplying a clock is not described.

Here, when a clock is supplied to a peripheral device, power is consumed by the supplied clock in the peripheral device. For example, in an analog circuit into which a clock is inputted, when a signal is repeatedly inverted, dynamic power consumption occurs. In other words, there is a strong correlation between a clock supplied from the USE hub and power consumption in a peripheral device to which the clock is supplied.

Therefore, the inventors of the present invention found that power consumption of a USB system including a peripheral device can be reduce by controlling the clock supplied to the USE hub. For example, if the USB hub supplies a clock to a peripheral device at all times without considering the states of the host device and the peripheral device, even when the clock is not required, the clock is uselessly supplied, so that the power consumption cannot be reduced.

Therefore, a USB hub of the related art has a problem that when the USB hub supplies a clock to a peripheral device at all times, power is uselessly consumed in the peripheral device, so that it is difficult to reduce the power consumption in the USB system.

A USB hub according to the present invention includes an upstream USB port connecting to an upstream device via an upstream USB line, a downstream USB port connecting to a downstream device via a downstream USB line, a clock pin that supplies a clock for operating the downstream device to the downstream device, and a hub controller that stops clock supply to the downstream device via the clock pin when a connecting between the upstream USB port and the upstream device is disconnected or when the hub controller receives a power save mode request to the downstream USB port from the upstream device.

A control method of USB hub according to the present invention is a control method of a USB hub connected between an upstream device and a downstream device. The control method includes the steps of supplying a clock for operating the downstream device to the downstream device, and stopping clock supply to the downstream device when a connecting between the USB hub and the upstream device is disconnected or when a power save mode request to a downstream USB port of the USB hub is received from the upstream device.

In the present invention, when stop of the data communication between the upstream device and the downstream device is detected, the clock supply to the downstream device is stopped, so that it is possible to suppress power consumption while the data communication is not performed and also reduce power consumption of the USB system.

According to the present invention, it is possible to provide a USB hub and a control method of USB hub which can reduce power consumption in a USB system.

DETAILED DESCRIPTION

First Embodiment

Hereinafter, a first embodiment of the present invention will be described with reference to the drawings.

Figure 1:
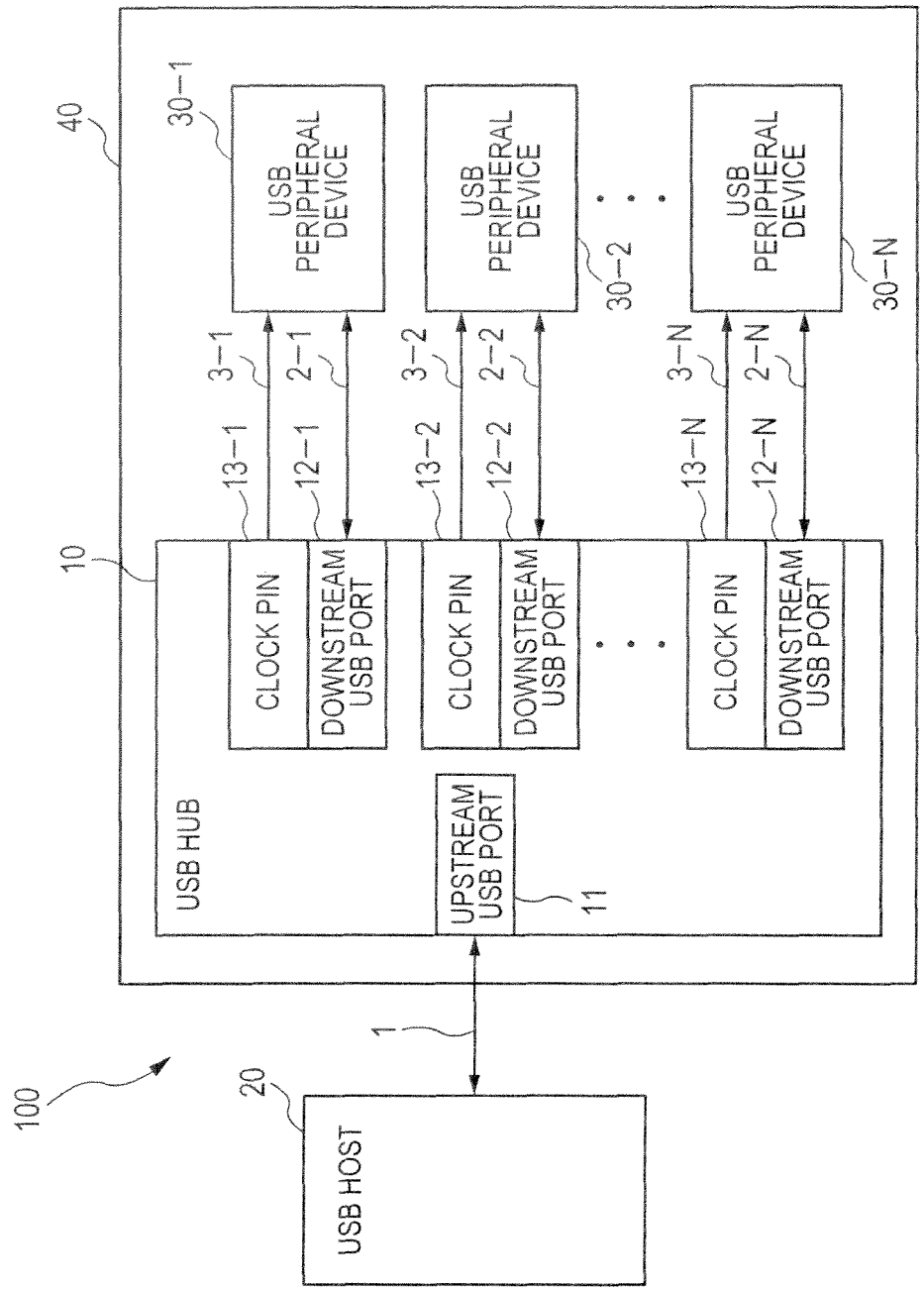
FIG. 1 is a configuration diagram for explaining a configuration of a USB connecting system according to a first embodiment of the present invention.

FIG. 1 shows a configuration of a USB connecting system according to the first embodiment of the present invention. As shown in FIG. 1, the USB connecting system 100 includes a USB host 20, a USB hub 10, and USB peripheral devices 30-1, 30-2, . . . , and 30-N (any one of the USB peripheral devices may be referred to as a peripheral device 30). In the USB connecting system 100, the USB host 20 side of the USB hub 10 is referred to as upstream and the USB peripheral device 30 side of the USB hub 10 is referred to as downstream.

The USB host (upstream device) 20 is a device that accesses any USB peripheral device 30 via a USB line according to USB protocol and performs data communication with the peripheral device. The USB host 20 is, for example, an information processing device such as a personal computer. When a peripheral device is connected to the USB host 20 via a USB line, the USB host 20 performs an enumeration process according to USB protocol, so that the USB host 20 recognizes the connected USB device and provides a peripheral device specific number for identifying the peripheral device. Data communication with an end point of the peripheral device is performed by using the peripheral device specific number.

In the present embodiment, the USB hub 10 and the USB peripheral device 30 are disposed over a circuit board 40. In other words, in this example, the USB hub 10 and the USB peripheral device 30 are fixed and connected to each other at all times and they are non-removable. Further, the USB host 20 may also be disposed over the circuit board 20 and the USB host 20, the USB hub 10, and the USB peripheral device 30 may be set to non-removable.

The USB hub 10 and the USE peripheral device 30 may be connected by a cable to be removable. In this case, if a clock line is disconnected while the USE peripheral device 30 is operating, the operation of the USE peripheral device 30 is not guaranteed. Therefore, it is preferred that the clock line is disconnected while the clock supply is stopped.

The USE peripheral device (downstream device) 30 receives an access from the USB host 20 via the USB line according to USB protocol and performs data communication with the USB host. The USB peripheral device 30 is, for example, a data storage device such as a flash memory. The USB peripheral device 30 operates by a clock supplied from the USB hub 10. For example, the USB peripheral device 30 is a semiconductor device disposed over the circuit board 40. The clock is supplied to a USE controller (IC) for the peripheral device and the data communication by USB is enabled. When the USE peripheral device 30 is provided with a power source, the USB peripheral device 30 operates by self power. On the other hand, when the USE peripheral device 30 has no power source, the USB peripheral device 30 operates by bus power supplied from the USE line.

The USB hub 10 is a relay device that relays the data communication between the USB host 20 and the USB peripheral devices via USB lines according to USB protocol. The USB hub 10 includes an upstream USB port 11, downstream USE ports 12-1, 12-2, . . . , 12-N (any one of the downstream USB ports may be referred to as a downstream USB port 12), and clock pins 13-1, 13-2, . . . 13-N (any one of the clock pins may be referred to as a clock pin 13).

The upstream USB port 11 is a terminal for connecting to a USB line. The upstream USB port 11 is connected to the USB host 20 via an upstream USB line 1 to enable data communication with the USB host 20 by USB protocol. In this example, the upstream USB line 1 is a normal USB cable and removable from the USB port 11.

The upstream USB line 1 is a bus line including a plurality of signal lines according to USB protocol and includes a signal line that supplies VBUS power and a data signal line that inputs/outputs data.

The downstream USB ports 12-1, 12-2, . . . , 12-N are terminals for connecting to USB lines and are respectively connected to the USB peripheral devices 30-1, 30-2, . . . , and 30-N via downstream USB lines 2-1, 2-2, . . . , 2-N to enable data communication with the USB peripheral devices 30-1, 30-2, . . . , and 30-N by USB protocol. In this example, the downstream USB line 2 is a line over the circuit board and is not removable. The downstream USB line 2 includes a signal line of VBUS power and a data signal line in the same manner as the upstream USB line 1.

The clock pins 13-1, 13-2, . . . , 13-N are terminals for connecting to clock lines and are respectively connected to the USB peripheral devices 30-1, 30-2, . . . , and 30-N via clock lines 3-1, 3-2, . . . , 3-N to supply a clock to the USB peripheral devices 30-1, 30-2, . . . , and 30-N. In this example, the clock line 3 is a line over the circuit board and is not removable. The clock pin 13 is provided for each downstream USB port 12 and for each USB peripheral device 30. The clock may be supplied from one clock pin 13 to a plurality of USB peripheral devices 30.

Figure 2:
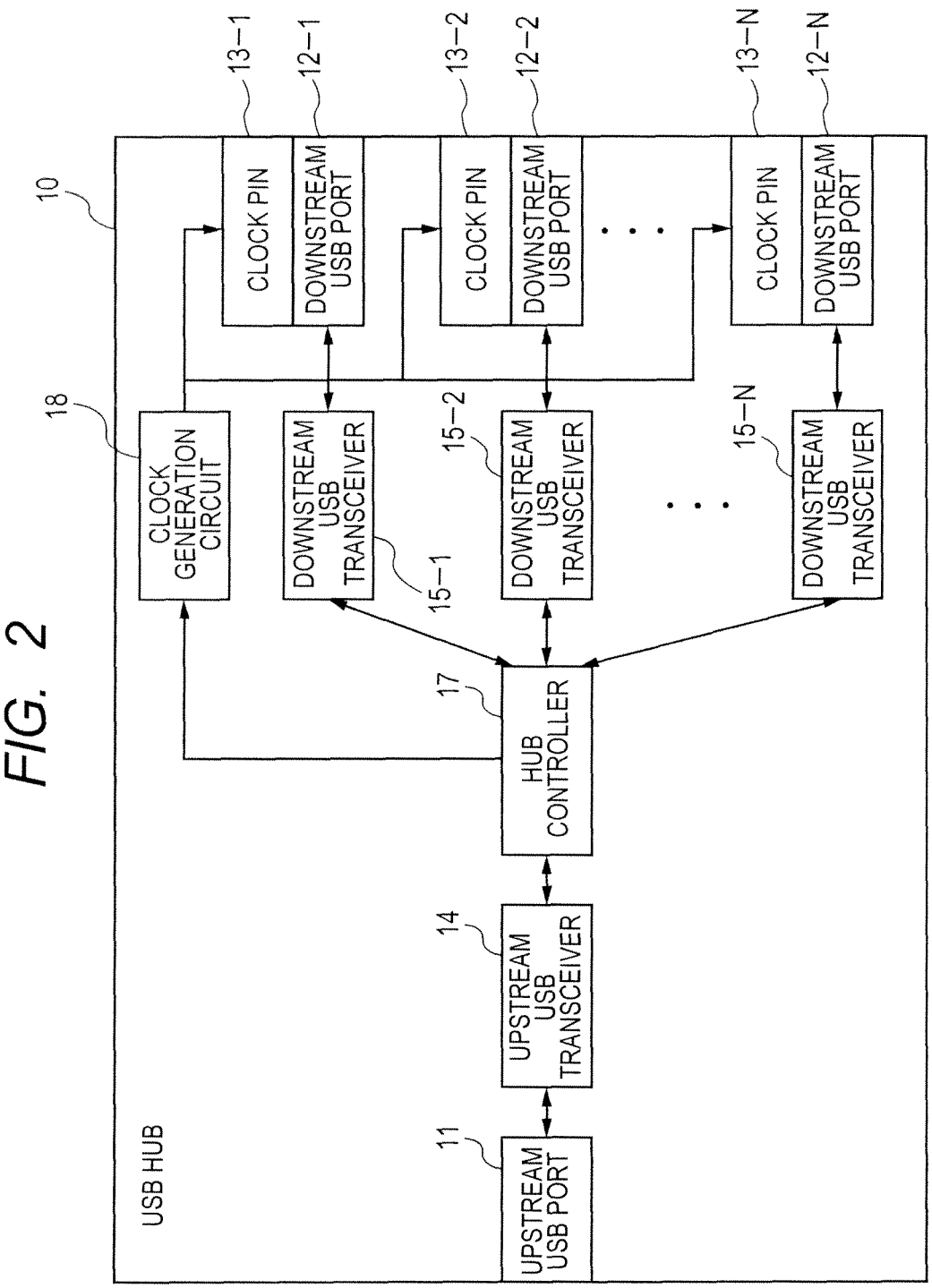
FIG. 2 is a configuration diagram for explaining a configuration of a USB hub according to the first embodiment of the present invention.

FIG. 2 shows a configuration of the USB hub according to the first embodiment of the present invention. The USB hub 10 includes the upstream USB port 11, the downstream USB ports 12, and the clock pins 13 as described above, and further includes an upstream USB transceiver 14, downstream USB transceivers 15-1, 15-2, . . . , 15-N (any one of the downstream USB transceivers may be referred to as a downstream USB transceiver 15), a hub controller 17, and a clock generation circuit 18.

The USB hub 10 is a semiconductor device disposed over the circuit board 40. For example, the entire configuration of the USB hub 10 may be formed into one chip, the hub controller 17, the upstream USB transceiver 14, and the downstream USB transceivers 15 may be formed into one chip, or the hub controller 17 may be formed into one chip.

The upstream USB transceiver 14 is a transmission/reception circuit that transmits and receives data to and from the upstream USB line 1 via the upstream USB port 11. The downstream USB transceiver 15 is a transmission/reception circuit that transmits and receives data to and from the downstream USB line 2 via the downstream USB port 12.

The hub controller 17 is a control circuit that controls data communication between the USB host 20 and the USB peripheral devices 30. For example, the hub controller 17 controls enumeration with the USB host 20, recognition of the USB peripheral devices 30, and clock supply to the USB peripheral devices 30.

The enumeration is a process of data transmission and reception to establish a communication path when a USB line is connected. It is possible to recognize information of a peripheral device connected through a USB line by the enumeration.

The clock generation circuit 18 generates a clock having a desired frequency. The clock generation circuit 18 supplies a clock to the USB peripheral device 30 via the clock pin 13 according to the control from the hub controller 17. The hub controller 17 instructs each port to start or stop the clock supply. All the USE peripheral devices 30 can be operated by the clock of the clock generation circuit 18, so that it is not necessary to provide a clock generation circuit in each of the USB peripheral devices 30.

Figure 3:
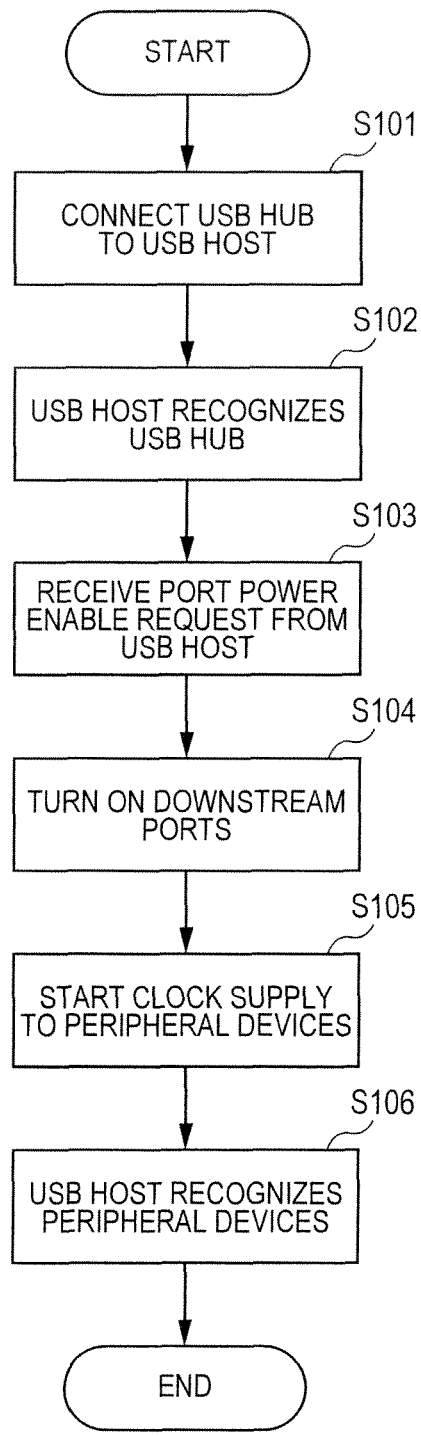
FIG. 3 is a flowchart for explaining an operation of the USB hub according to the first embodiment of the present invention.

Next, an operation of the USB hub 10 when the USB hub 10 is connected to the USB host 20 will be described with reference to FIGS. 3 to 5. FIG. 3 shows a flow of the operation of the USB hub 10 in this case.

First, the USB hub 10 is connected to the USB host 20 (S101). When the USB hub 10 is not physically connected to the USB host 20 via the upstream USB line 1, the upstream USB line 1 is inserted into the USB port of the USB host 20 and the upstream USB port 11 of the USB hub 10 to physically couple the USB hub 10 to the USB host 20. If the USB host 20 is turned off, the USB host 20 is turned on, so that the USE host 20 and the USB hub 10 are electrically connected to each other.

In other words, connecting the USB devices to each other includes physically connecting between the USB devices by a USE line and electrically connecting between the USB devices which are physically connected. When the upstream USB line 1 is connected or the USB host 20 is turned on, the VBUS power of the upstream USB line 1 is turned on and the USB hub 10 detects a connecting with the USB host 20.

Next, the USB host 20 recognizes the USB hub 10 (S102). The USB host 20 and the USB hub 10 are connected, so that the USB host 20 performs enumeration with the USB hub 10, acquires device information of the USB hub 10, provides specific information, and recognizes the USB hub 10. Thereby, the USB hub 10 also recognizes the USB host 20.

Next, the USB hub 10 receives a port power enable request from the USB host 20 (S103). The USB host 20 recognizes the USB hub 10, so that the USB host 20 further transmits a port power enable request of the downstream USE ports 12 of the USB hub 10.

Next, the USB hub 10 turns on the downstream USE ports 12 (S104). The USB hub 10 receives the port power enable request from the USB host 20, so that the USB hub 10 turns on the VBUS power of all the downstream USB ports 12.

Next, the USB hub 10 starts clock supply to the USB peripheral devices 30 (S105). As described later, in the present embodiment, the USB hub 10 stops clock supply to the USB peripheral devices 30 before the USB hub 10 is connected to the USB host 20. Therefore, the USB hub 10 turns on the VBUS power of the downstream USB lines 2 and starts clock supply from all the clock pins 13 to operate the USB peripheral devices 30.

Next, the USB host 20 recognizes the USB peripheral devices 30 via the USB hub 10 (S106). The VBUS power of the USB lines 3 is turned on and the clock is supplied, so that the USB peripheral devices 30 start operation and can communicate with the USB host 20 via the USB hub 10. The USB host 20 and the USB peripheral devices 30 are connected, so that the USB host 20 performs enumeration with the USB peripheral devices 30, acquires device information of the USB peripheral devices 30, provides specific information, and recognizes the USB peripheral devices 30.

Figure 4:
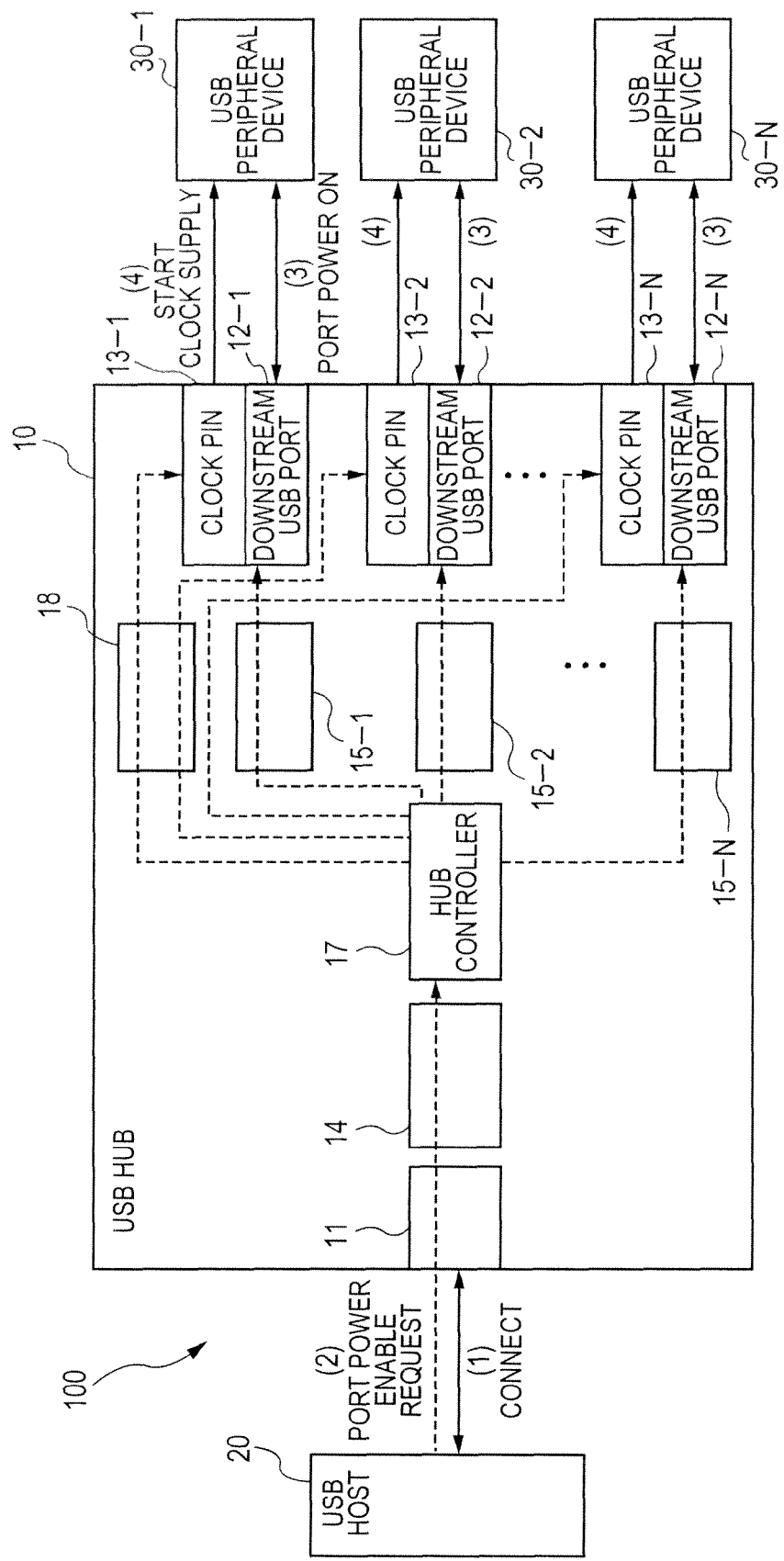
FIG. 4 is a diagram for explaining the operation of the USB hub according to the first embodiment of the present invention.

FIG. 4 shows a detailed operation of the USB hub 10 when the USB hub 10 is connected to the USB host 20.

First, the USB hub 10 is connected to the USB host 20 (FIG. 4 (1)). When the upstream USB line 1 is connected between the USB host 20 and the USB hub 10, the upstream USB transceiver 14 detects that the VBUS power of the upstream USB line 1 is turned on and notifies the hub controller 17 of this detection result. At this time, the hub controller 17 becomes in a state of waiting for completion of the enumeration with the USB host 20.

Then the enumeration is performed by the USB host 20 and the hub controller 17 and the USB host 20 recognizes the USB hub 10. At this time, the hub controller 17 becomes in a state in which the enumeration with the USB host 20 is completed.

Next, the USB hub 10 receives the port power enable request from the USB host 20 (FIG. 4 (2)). The USB host 20 transmits the port power enable request whose destination is the USB hub 10. The hub controller 17 analyzes the destination and the content of the request received via the upstream USB transceiver 14 and performs a process corresponding to the port power enable request transmitted to the USB hub 10.

Next, the USB hub 10 turns on the downstream USB port 12 of the USE hub 10 (FIG. 4 (3)). The hub controller 17 instructs that the downstream USB ports 12 be turned on according to the received port power enable request and turns on the VBUS power of the downstream USB ports 12.

Next, the USB hub 10 starts clock supply to the USB peripheral devices 30 (FIG. 4 (4)). After turning on the downstream USB ports 12, the hub controller 17 instructs the clock generation circuit 18 to supply a clock. The clock generation circuit 18 starts clock supply to the USB peripheral devices 30 from all the clock pins 13.

Thereby the operations of the USB peripheral devices are started and when the enumeration is performed between the USB host 20 and the USB peripheral devices 30, the USE host 20 recognizes the USB peripheral devices 30 connected to the USB host 20.

Figure 5:
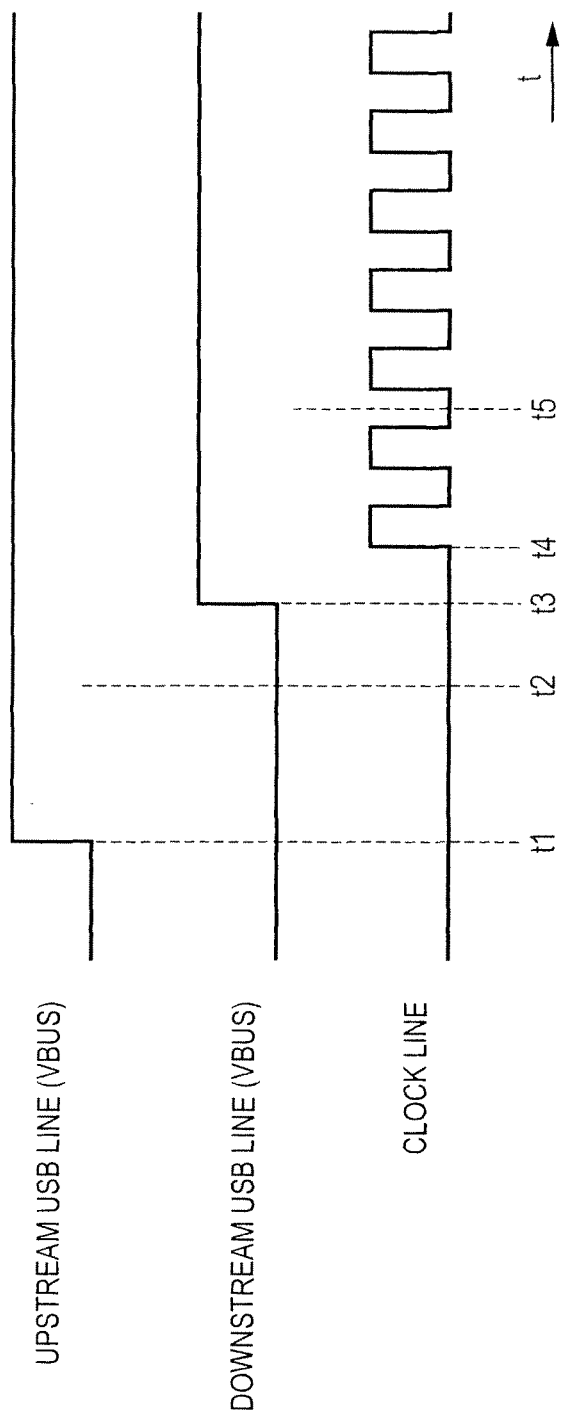
FIG. 5 is a timing chart for explaining the operation of the USB hub according to the first embodiment of the present invention.

FIG. 5 shows operation timing of each signal line when the USB hub 10 is connected to the USB host 20.

When the upstream USB line 1 is connected to the USB hub 10, the VBUS power of the upstream USB line 1 rises to high at t1.

The VBUS power of the upstream USB line 1 rises to high, so that the USB host 20 recognizes the USB hub 10 by the enumeration at t2 and the port power enable request is outputted from the USB host 20 to the USB hub 10 on the data signal line.

When the USE hub 10 receives the port power enable request from the data signal line of the upstream USB line 1, the USB hub 10 raises the VBUS power of the downstream USB lines 2 to high at t3.

After raising the VBUS power of the downstream USB lines 2, the USB hub 10 starts clock supply to the clock lines 3 at t4.

Here, although the timing of raising the VBUS power and the timing of starting the clock supply may be the same, it is preferable that the clock supply is started after the VBUS power is raised. For example, if the clock is supplied before the VBUS power is raised, there is a risk that a clock buffer to which the clock is inputted is broken depending on the specification of the peripheral device, so that the clock may be supplied after the VBUS power is raised.

When the clock supply is started, the USB peripheral devices 30 start operation at t5 and the USB host 20 recognizes the USB peripheral devices 30 by the enumeration.

Figure 6:
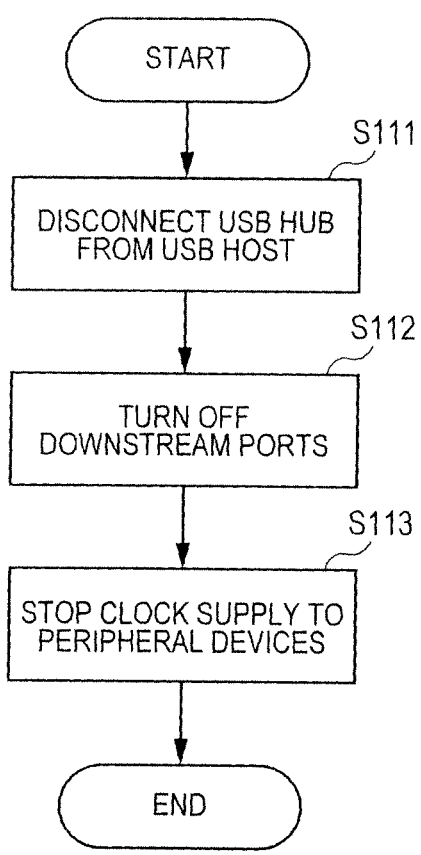
FIG. 6 is a flowchart for explaining an operation of the USB hub according to the first embodiment of the present invention.

Next, an operation of the USB hub 10 when the USB hub 10 is disconnected from the USB host 20 will be described with reference to FIGS. 6 to 8. FIG. 6 shows a flow of the operation of the USB hub 10 in this case.

First, the USB hub 10 is disconnected from the USB host 20 (S111). For example, the upstream USB line 1 is pulled out from the USB port of the USB host 20 or the upstream USB port 11 of the USB hub 10 to physically disconnect the USB hub 10. Or, the USB host 20 is turned off, so that the USB host 20 and the USB hub 10 are electrically disconnected from each other.

In other words, disconnecting the USE devices from each other includes physically disconnecting the USB devices from each other by a USB line and electrically disconnecting the USB devices from each other, which are physically connected. When the upstream USB line 1 is disconnected or the USB host 20 is turned off, the VBUS power of the upstream USE line 1 is turned off and the USB hub 10 detects a disconnecting from the USB host 20. Thereby the communication between the USB host 20 and the USB hub 10 is disabled. Also, the communication between the USB host 20 and the USB peripheral devices 30 and the communication between the USB hub 10 and the USB peripheral devices 30 are disabled. In other words, the data communication between the USB host 20 and the USE peripheral devices 30 is stopped.

Next, the USB hub 10 turns off the downstream USB ports 12 (S112). The upstream USB line 1 between the USB host 20 and the USB hub 10 is disconnected and the data communication between the USE host 20 and the USB peripheral devices 30 is stopped, so that the USB hub 10 turns off the VBUS power of all the downstream USE ports 12.

Next, the USE hub 10 stops the clock supply to the USB peripheral devices 30 (S113). The USB hub 10 turns off the VBUS power of the downstream USB lines 2 and stops the clock supply from all the clock pins 13 to stop the operations of the USB peripheral devices 30.

Figure 7:
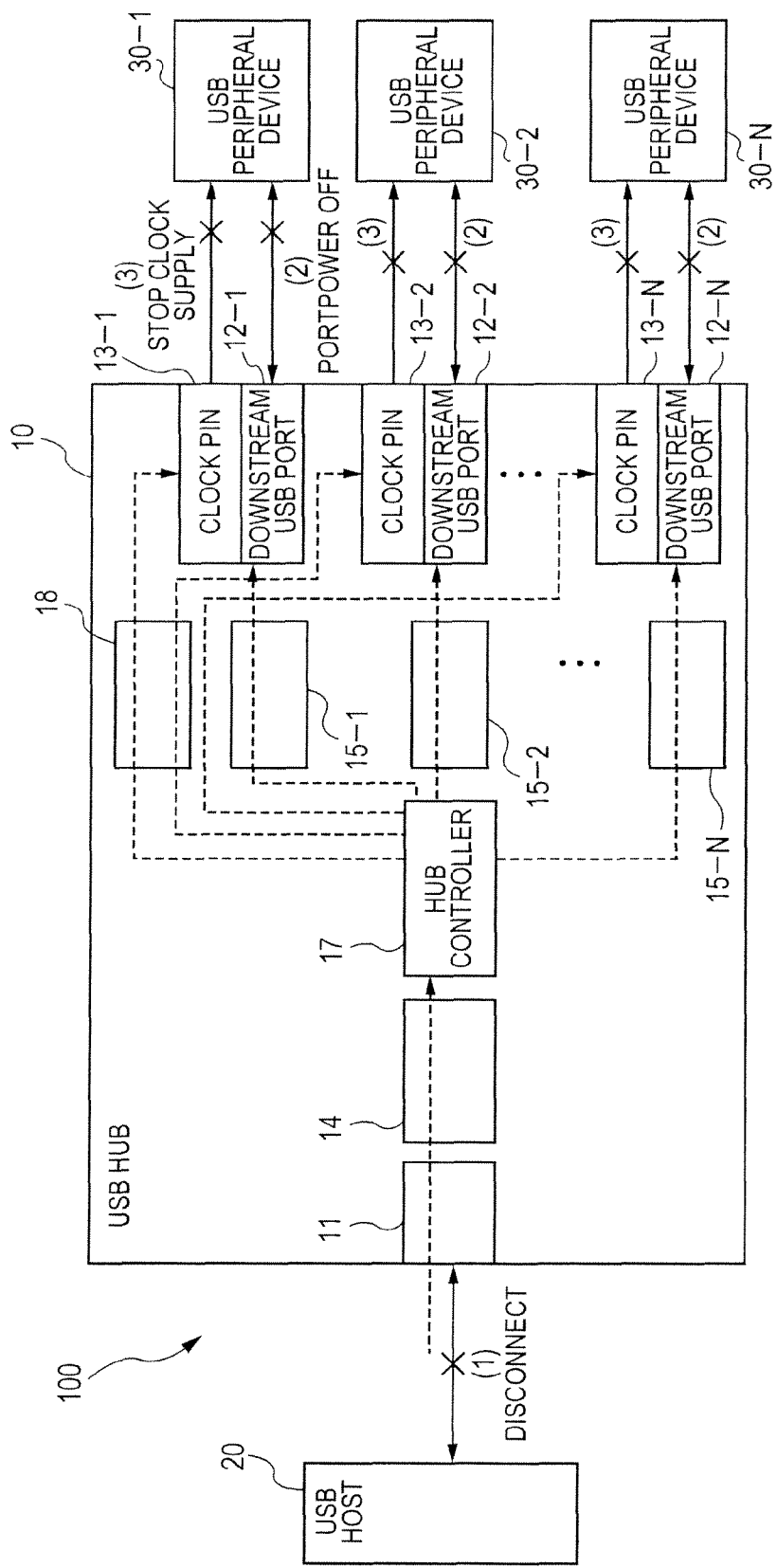
FIG. 7 is a diagram for explaining the operation of the USB hub according to the first embodiment of the present invention.

FIG. 7 shows a detailed operation of the USE hub 10 when the USB hub 10 is disconnected from the USB host 20.

First, the USB hub 10 is disconnected from the USB host 20 (FIG. 7 (1)). When the upstream USB line 1 between the USB host 20 and the USB hub 10 is disconnected, the upstream USB transceiver 14 detects that the VBUS power of the upstream USB line 1 is turned off and notifies the hub controller 17 of this detection result. At this time, the hub controller 17 determines that the data communication between the USB host 20 and the USB hub 10 is stopped and the data communication between the USB host 20 and the USB peripheral devices 30 is also stopped.

Next, the USB hub 10 turns off the downstream USB ports 12 (FIG. 7 (2)). Since the data communication between the USB host 20 and the USB peripheral devices 30 is stopped, the hub controller 17 instructs that the downstream USB ports 12 be turned off and turns off the VBUS power of the downstream USB ports 12. When the VBUS power is turned off, the USB peripheral device 30 detects that the downstream USB line 2 is disconnected Next, the USB hub 10 stops the clock supply to the USB peripheral devices 30 (FIG. 7 (3)). Since the data communication between the USB host 20 and the USB peripheral devices 30 is stopped, after turning off the downstream USB ports 12, the hub controller 17 instructs the clock generation circuit 18 to stop the clock supply and the clock generation circuit 18 stops the clock supply from all the clock pins 13 to the USE peripheral devices 30.

Figure 8:
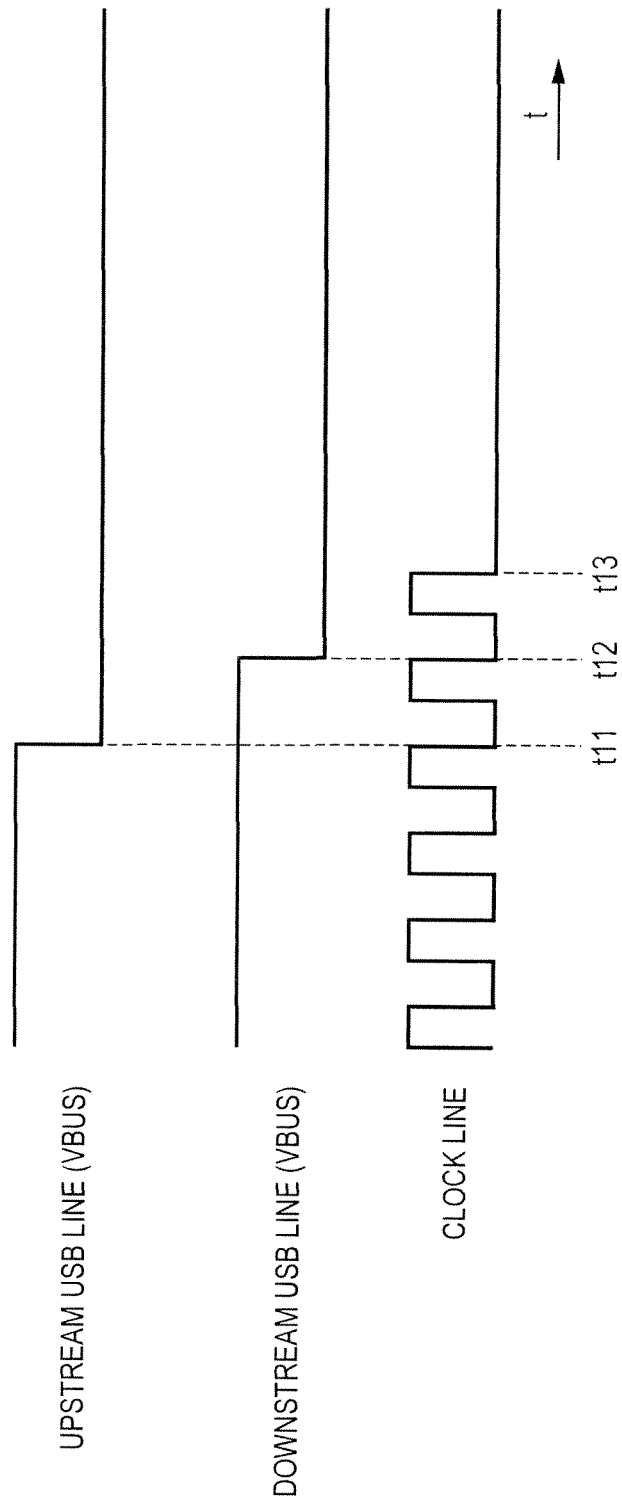
FIG. 8 is a timing chart for explaining the operation of the USB hub according to the first embodiment of the present invention.

FIG. 8 shows operation timing of each signal line when the USB hub 10 is disconnected from the USB host 20.

When the upstream USB line 1 is disconnected, the VBUS power of the upstream USB line 1 drops to low at t11.

Since the VBUS power of the upstream USB line 1 drops to low, the USB hub 10 drops the VBUS power of the downstream USB lines 2 to low at t12.

After dropping the VBUS power of the downstream USB lines 2, the USB hub 10 stops the clock supply to the clock lines 3 at t13.

Here, the timing of dropping the VBUS power and the timing of stopping the clock supply may be the same. When the clock supply is stopped, the operations of the USB peripheral devices 30 are stopped, so that the power consumption while the operations are stopped is suppressed.

As described above, in the present embodiment, the USB hub controls the clock supply to the USB peripheral devices according to the state of connecting to the USB host. In USB, the USE peripheral devices do not communicate with each other and the USB host and the USB peripheral devices are connected and communicate with each other, so that it is possible to determine whether or not there is communication of the USB peripheral devices from the state of connecting to the USB host.

Specifically, when the USB hub is connected to the USB host, the USB hub starts clock supply to the USB peripheral devices to start communication operation with the USB peripheral devices, and when the connecting to the USB host is disconnected, the USB hub stops the clock supply to the USB peripheral devices to stop the communication operation with the USB peripheral devices. Thereby, while the communication of the USB peripheral devices is stopped by disconnecting the USB line, by stopping the clock supply, it is possible to reduce the power consumption of the USB peripheral devices and save the power consumption of the entire USB system.

Second Embodiment

Hereinafter, a second embodiment of the present invention will be described with reference to the drawings. Although, in the first embodiment, the clock supply to the peripheral devices is controlled according to the state of connecting between the USB host and the USB hub, in the present embodiment, the clock supply to the peripheral devices is also controlled when a downstream USB port is set to a suspend state (a sleep state) by a port suspend (port sleep) request from the USB host. The configuration of the USB connecting system and the configuration of the USB hub are the same as those shown in FIGS. 1 and 2.

Figure 9:
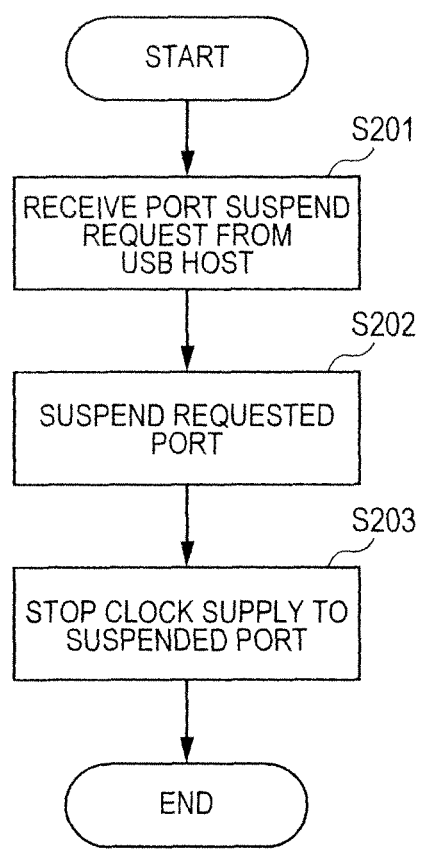
FIG. 9 is a flowchart for explaining an operation of a USB hub according to a second embodiment of the present invention.

An operation of the USB hub 10 when the downstream USB port 12 is suspended will be described with reference to FIGS. 9 to 11. FIG. 9 shows a flow of the operation of the USB hub 10 in this case.

First, the USB hub 10 receives a port suspend request from the USB host 20 (S201). In order to suspend the downstream USB port 12 of the USB hub 10, the USB host 20 transmits the port suspend request that specifies the downstream USB port 12 to be suspended.

Next, the USB hub 10 suspends the requested downstream USB port 12 (S202). The USB hub 10 receives the port suspend request from the USB host 20, so that the USB hub 10 performs a suspend process on the downstream USB port 12 specified by the port suspend request. The USB hub 10 performs a predetermined suspend process between the downstream USB port 12 and the USB peripheral device 30 connected to the downstream USB port 12 and sets the downstream USB port 12 to a suspend state.

Suspending the USB port means setting the USB port to a suspend mode (a sleep mode) from a normal state which is a normal operation mode. The USB hub 10 exchanges information necessary to suspend the USB port with the USB peripheral device, so that the USB port and the USB peripheral device are set to the suspend state. The suspend state is a power saving state. In the suspend state, the power consumption is reduced by temporarily halting the communication operation and stopping power supply to a predetermined circuit.

When the downstream USB port 12 is suspended, the communication between the USB hub 10 and the USB peripheral device 30 is temporarily halted and also the communication between the USB host 20 and the USB peripheral device 30 is halted. In other words, the data communication between the USB host 20 and the USB peripheral devices 30 is stopped.

Next, the USB hub 10 stops the clock supply to the USB peripheral devices 30 (S203). In order to stop the operation of the USB peripheral device 30, the USB hub 10 stops clock supply from a clock pin 13 corresponding to the suspended downstream USB port 12.

Figure 10:
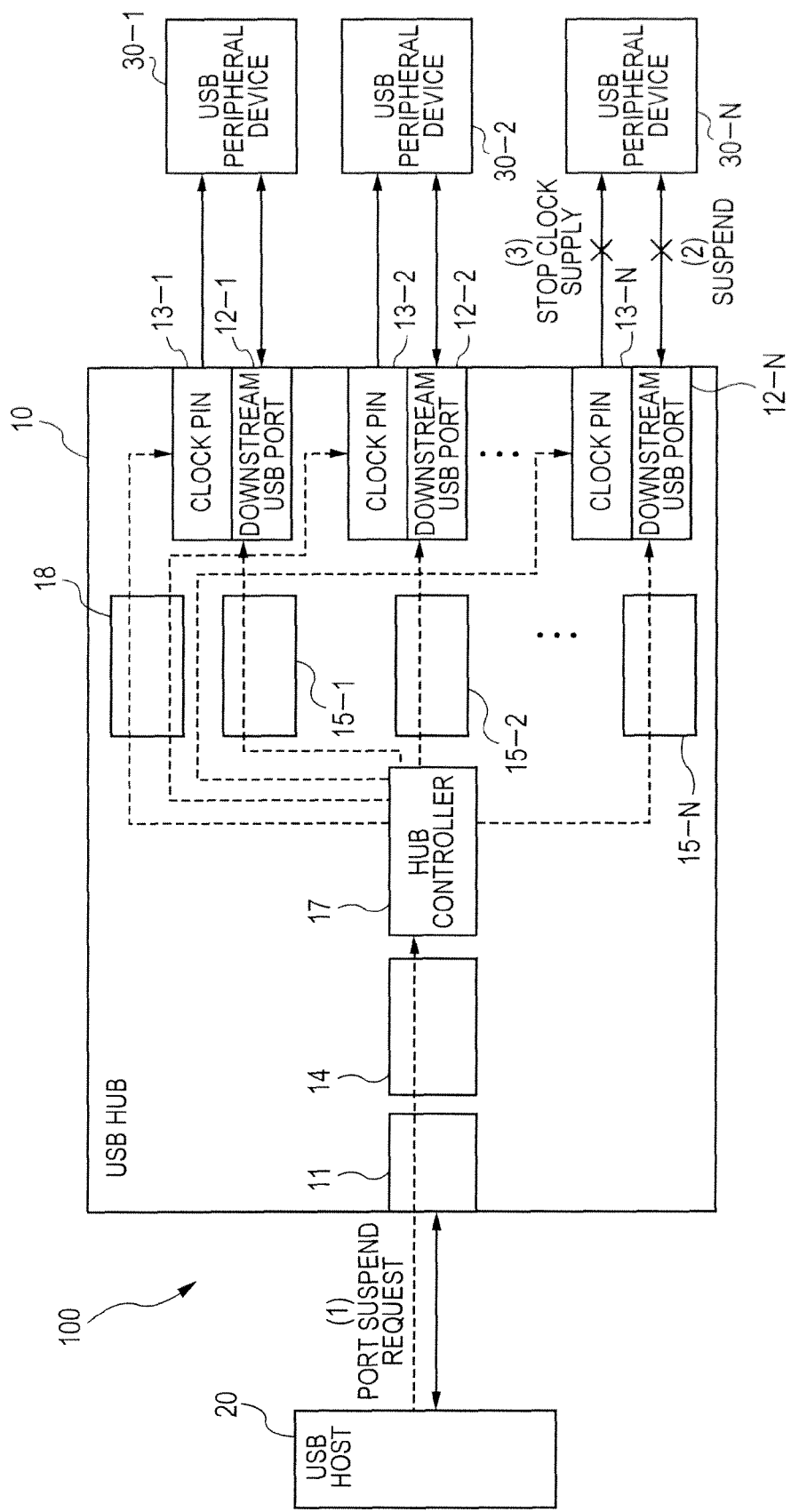
FIG. 10 is a diagram for explaining the operation of the USE hub according to the second embodiment of the present invention.

FIG. 10 shows a detailed operation of the USB hub 10 when the USB hub 10 suspends the downstream USB port 12.

First, the USB hub 10 receives the port suspend request from the USB host 20 (FIG. 10 (1)). The USB host 20 transmits the port suspend request whose destination is the USB hub 10 and which specifies the downstream USB port 12. The hub controller 17 analyzes the destination and the content of the request received via the upstream USB transceiver 14 and performs a process corresponding to the port suspend request transmitted to the USB hub 10.

Next, the USB hub 10 suspends the requested downstream USB port 12 (FIG. 10 (2)). The hub controller 17 instructs a USB transceiver 15 corresponding to the specified downstream USB port 12 to perform a suspend process according to the received port suspend request. The USB transceiver 15 performs the suspend process between the downstream USB port 12 and the USB peripheral device 30 and sets the downstream USB port 12 to a suspend state.

Next, the USB hub 10 stops the clock supply to the USB peripheral devices 30 (FIG. 10 (3)). The hub controller 17 instructs the clock generation circuit 18 to stop the clock supply. The clock generation circuit 18 stops the clock supply to the USB peripheral device 30 from a clock pin corresponding to the suspended downstream USB port 12.

Figure 11:
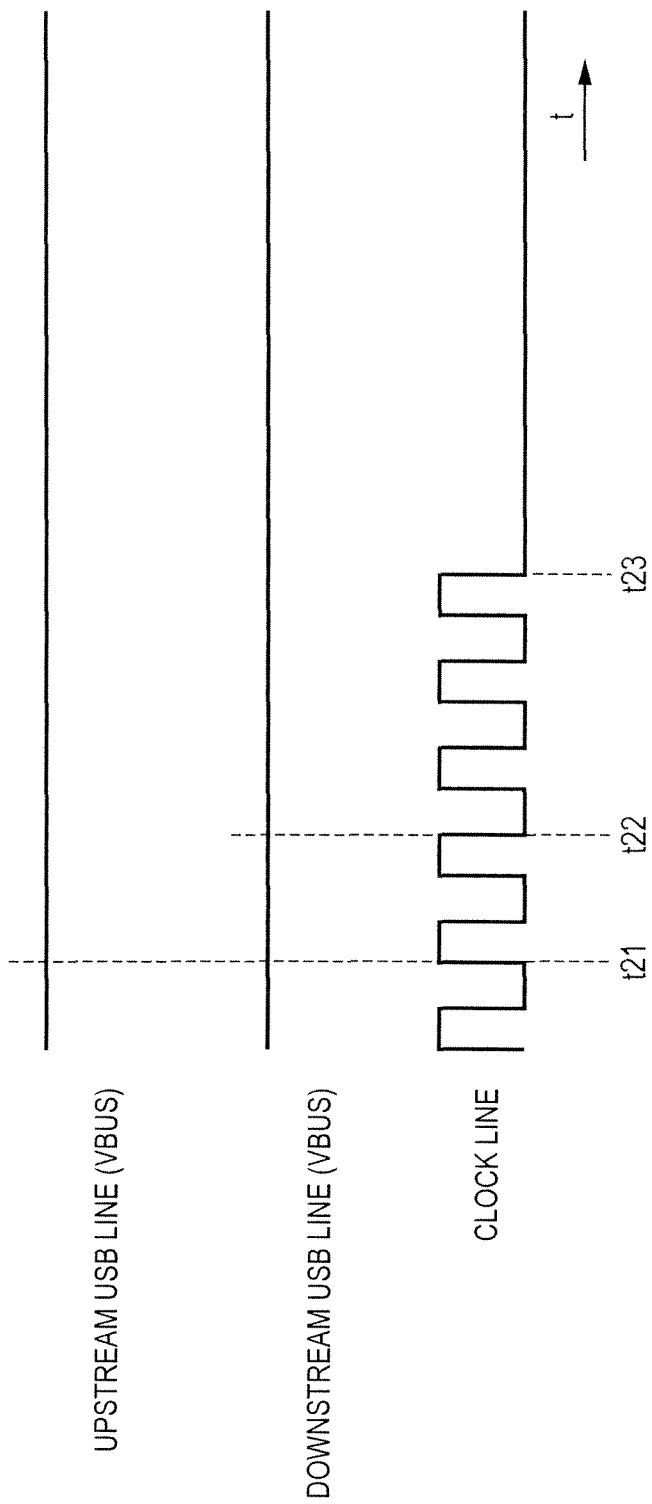
FIG. 11 is a timing chart for explaining the operation of the USB hub according to the second embodiment of the present invention.

FIG. 11 shows operation timing of each signal line when the downstream USB port 12 is suspended.

The USB hub 10 receives the port suspend request that specifies downstream USE port 12 on the data signal line of the upstream USB line 1 at t21.

The USB hub 10 performs the suspend process on the data signal line of the downstream USB line 2 at t22 according to the received port suspend request, so that the downstream USB port 12 is suspended.

When the port is suspended, the USB hub 10 stops the clock supply to a clock line 3 corresponding to the suspended downstream USB port 12 at t23.

When the clock supply is stopped, the operation of the USB peripheral device 30 is stopped, so that the power consumption while the operation is stopped is suppressed.

Figure 12:
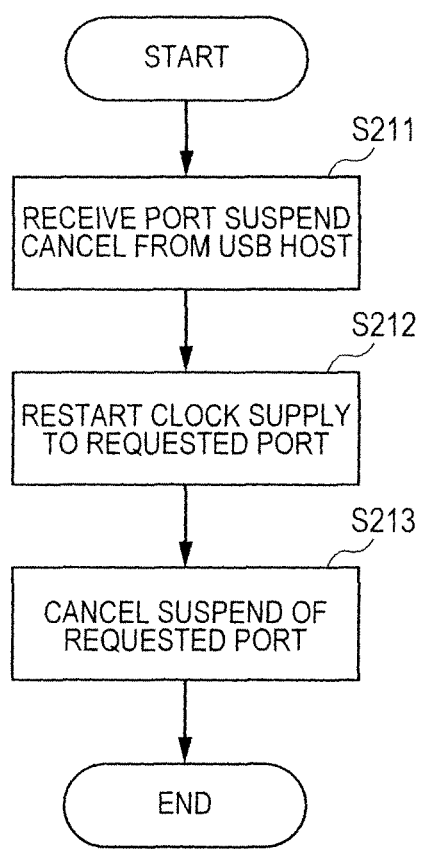
FIG. 12 is a flowchart for explaining an operation of the USB hub according to the second embodiment of the present invention.

Next, an operation of the USB hub 10 when the downstream USB port 12 is resumed will be described with reference to FIGS. 12 to 14. FIG. 12 shows a flow of the operation of the USB hub 10 in this case.

First, the USB hub 10 receives a port resume request from the USB host 20 (S211). In order to resume the downstream USB port 12 of the USB hub 10, the USB host 20 transmits the port resume request that specifies the downstream USB port 12 that will be resumed.

Next, the USB hub 10 restarts the clock supply to the USB peripheral device 30 connected to the requested downstream USB port 12 (S212). In order to operate the USB peripheral device 30, the USB hub 10 starts clock supply from a clock pin 13 corresponding to the downstream USB port 12 that will be resumed.

Next, the USB hub 10 resumes the requested downstream USB port 12 (S213). The USB hub 10 receives the port resume request from the USB host 20 and the clock supply is restarted, so that the USB hub 10 performs a resume process on the downstream USB port 12 specified by the port resume request. The USB hub 10 performs a predetermined resume process between the downstream USB port 12 and the USB peripheral device 30 connected to the downstream USB port 12 and sets the downstream USB port 12 to a normal communication state.

Resuming the USB port means setting the USB port to a normal state, which is a normal operation mode, from the suspend mode. The USB hub 10 exchanges information necessary to resume with the USB peripheral device, so that the USB port and the USB peripheral device are set to the normal state. When they are resumed, the halt of the communication operation is cancelled and the data communication is enabled.

When the downstream USB port 12 is resumed, the data communication between the USB hub 10 and the USB peripheral device 30 is restarted and also the communication between the USB host 20 and the USB peripheral device 30 is restarted. In other words, the stop of the data communication between the USB host 20 and the USB peripheral devices 30 is terminated.

Figure 13:
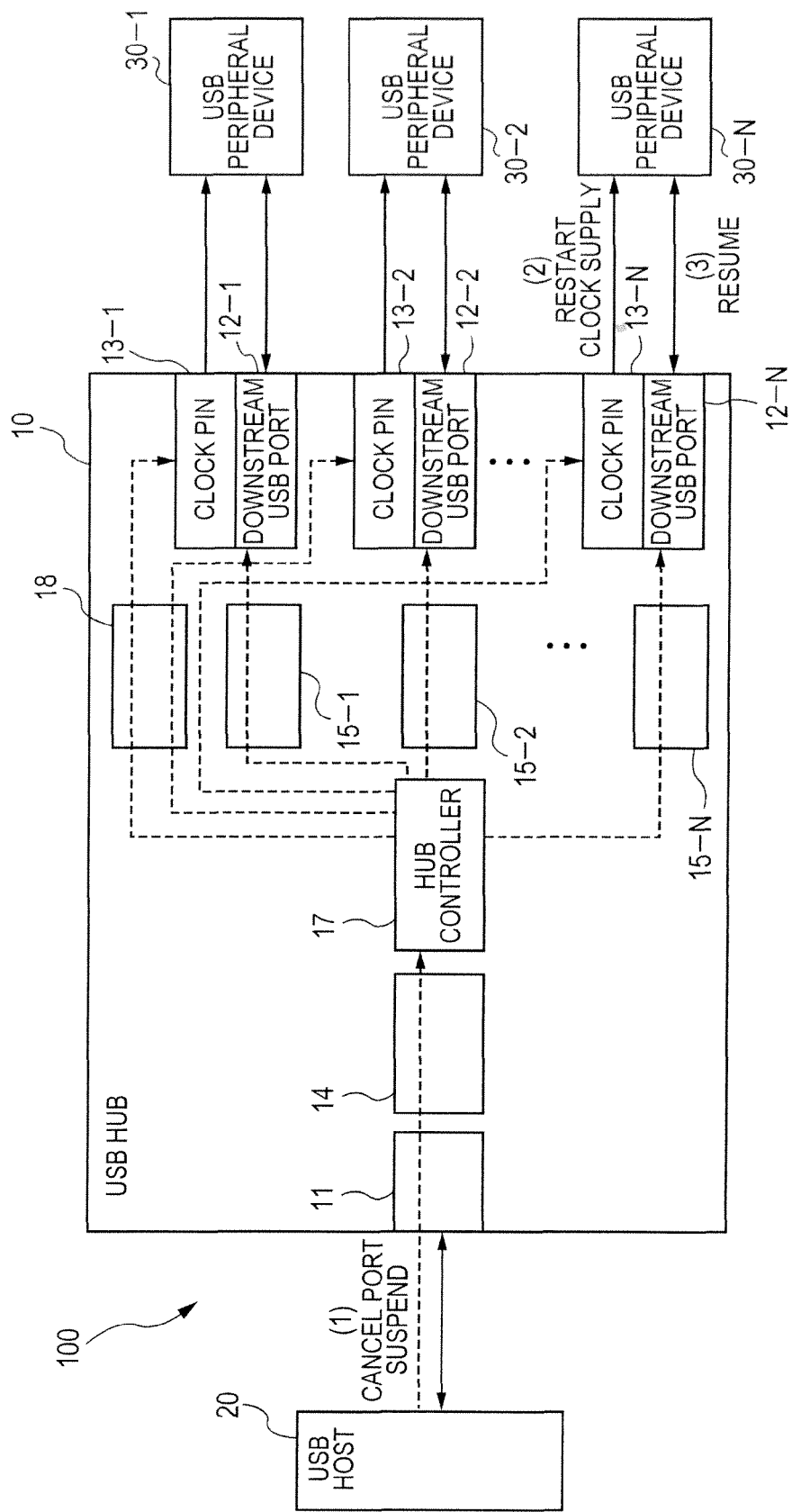
FIG. 13 is a diagram for explaining the operation of the USB hub according to the second embodiment of the present invention.

FIG. 13 shows a detailed operation of the USB hub 10 when the USB hub 10 resumes the downstream USB port 12.

First, the USB hub 10 receives the port resume request from the USB host 20 (FIG. 13 (1)). The USB host 20 transmits the port resume request whose destination is the USB hub 10 and which specifies the downstream USB port 12. The hub controller 17 analyzes the destination and the content of the request received via the upstream USB transceiver 14 and performs a process corresponding to the port resume request transmitted to the USB hub 10.

Next, the USB hub 10 restarts the clock supply to the USB peripheral device 30 connected to the requested downstream USB port 12 (FIG. 13 (2)). The hub controller 17 instructs the clock generation circuit 18 to start the clock supply. The clock generation circuit 18 starts the clock supply to the USB peripheral device 30 from a clock pin corresponding to the downstream USB port 12 that will be resumed.

Next, the USB hub 10 resumes the requested downstream USB port 12 (FIG. 13 (3)). The hub controller 17 instructs a USB transceiver 15 corresponding to the specified downstream USB port 12 to perform a resume process according to the received port resume request. The USB transceiver 15 performs the resume process between the downstream USB port 12 and the USB peripheral device 30 and sets the downstream USB port 12 to the normal state.

Figure 14:
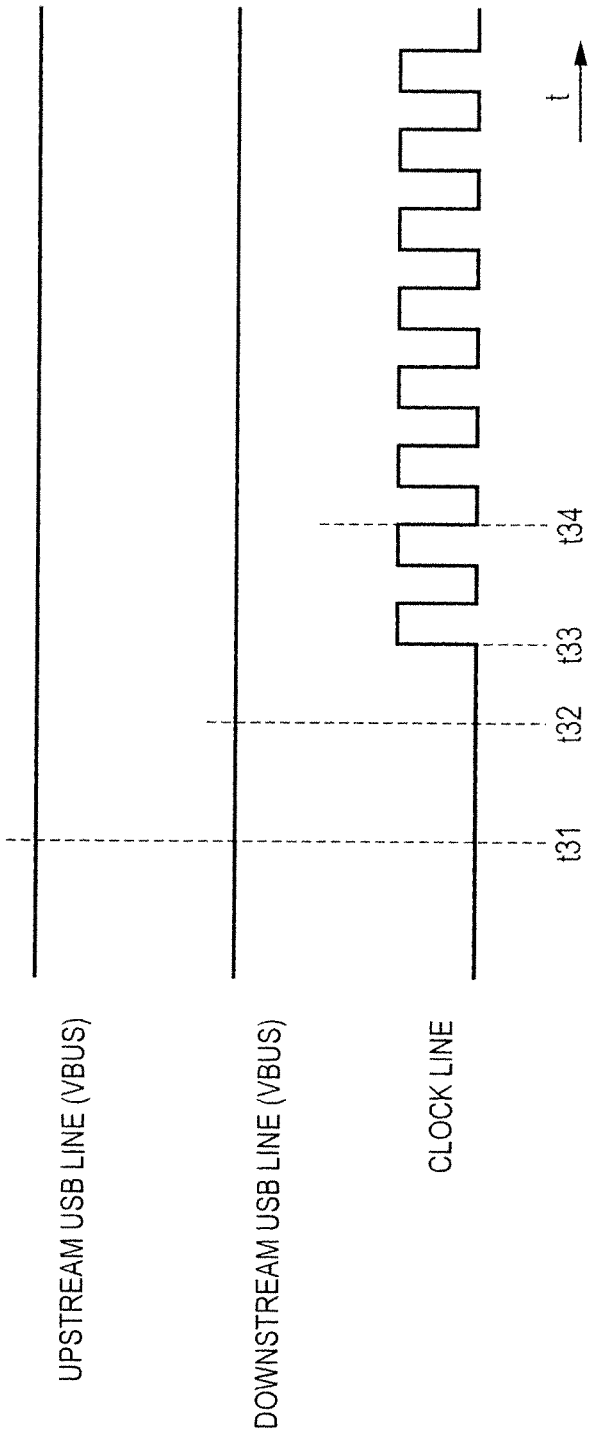
FIG. 14 is a timing chart for explaining the operation of the USB hub according to the second embodiment of the present invention.

FIG. 14 shows operation timing of each signal line when the downstream USB port 12 is resumed.

The USB hub 10 receives the port resume request that specifies downstream USB port 12 on the data signal line of the upstream USE line 1 at t31.

According to the received port resume request, at t32, the USB hub 10 starts the clock supply to a clock line 3 corresponding to the downstream USB port 12 that will be resumed.

The resume process is performed on the data signal line of the downstream USB line 2 at t33, so that the downstream USB port 12 is resumed and the downstream USB port 12 is set to a normal data communication state.

As described above, in the present embodiment, the USB hub controls the clock supply to the USB peripheral device according to the suspend state of the USB port. Specifically, when the USB hub receives a suspend request to the USE port from the USB host, the USB hub stops the clock supply to the USE peripheral device, and when the USB hub receives a resume request to the USB port from the USB host, the USB hub starts the clock supply to the USB peripheral device. Thereby, while the communication of the USB peripheral device is stopped by the suspend of the USB port, by stopping the clock supply, it is possible to reduce the power consumption of the USB peripheral device and save the power consumption of the entire USB system.

Third Embodiment

Hereinafter, a third embodiment of the present invention will be described with reference to the drawings. In the third embodiment, in addition to the first and the second embodiments, the frequency of the clock supplied to the peripheral device from the USB hub can be set.

Figure 15:
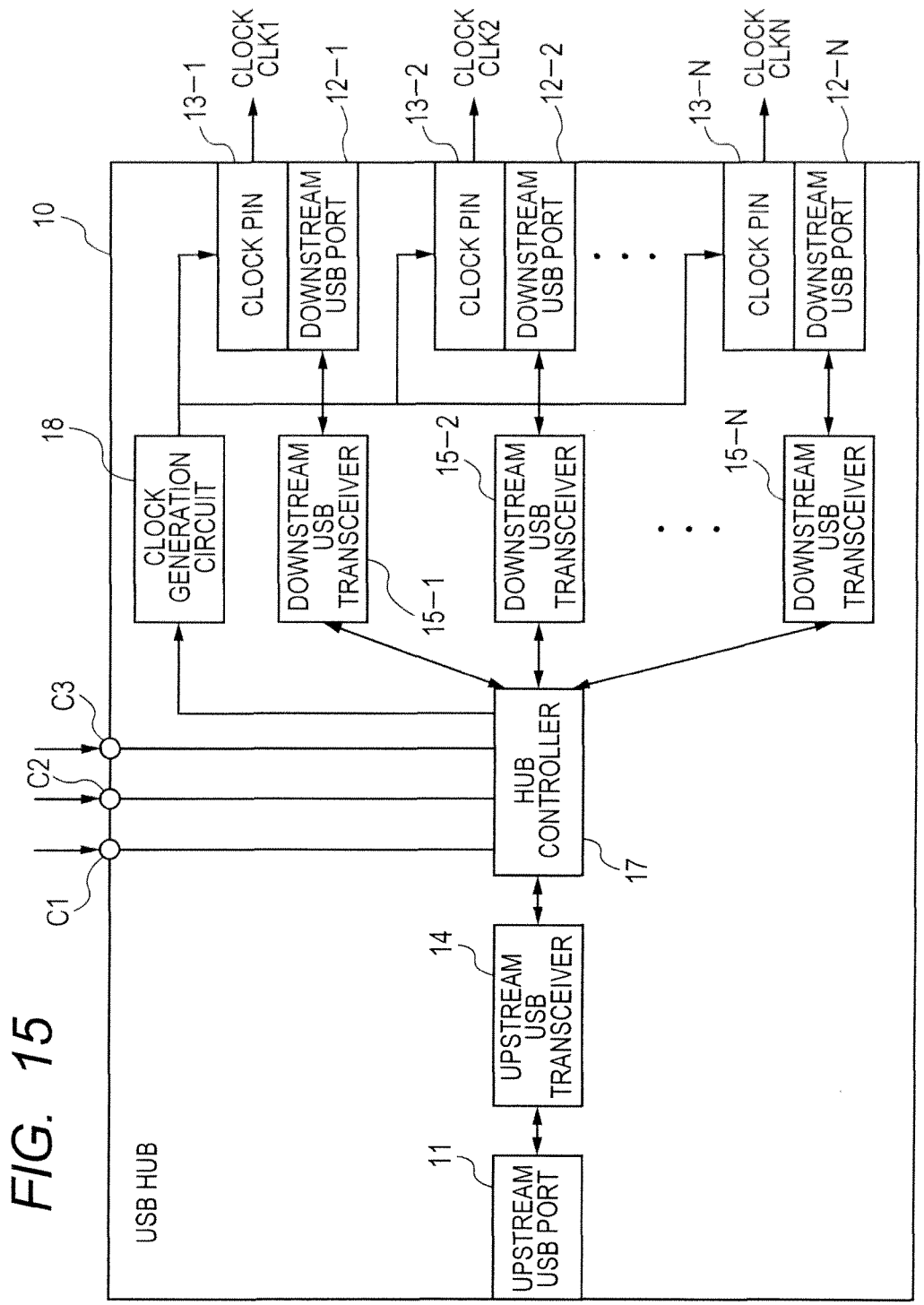
FIG. 15 is a configuration diagram for explaining a configuration of a USB hub according to a third embodiment of the present invention.

FIG. 15 shows a configuration of the USB hub according to the third embodiment of the present invention. The USB hub 10 includes setting terminals C1, C2, and C3 for setting the clock frequency in addition to the configuration shown in FIG. 2.

The hub controller 17 determines the frequency of the clock according to an input value (input voltage) of the setting terminals C1 to C3. The hub controller 17 notifies the clock generation circuit 18 of the determined frequency and the clock generation circuit 18 supplies a clock of the notified frequency to the USE peripherals 30. Clocks CLK1 to CLKN are outputted from the clock pins 13-1 to 13-N.

The frequency of the clock may be different for each clock pin (for each USB port). For example, the setting terminals, the number of which is the same as that of the downstream USE ports, are provided, the frequency of the clock CLK1 is determined by the setting terminal C1, the frequency of the clock CLK2 is determined by the setting terminal C2, and the frequency of the clock CLKN is determined by the setting terminal CN. In this case, for example, when the input of the setting terminal C1 is high, the frequency may be set to 12 MHz, when the input of the setting terminal C1 is low, the frequency may be set to 24 MHz, when the input of the setting terminal C2 is high, the frequency may be set to 12 MHz, and when the input of the setting terminal C2 is low, the frequency may be set to 30 MHz. The clock frequency is set for each USB port, so that the clock frequency can be more finely set according to the USB peripheral device to be connected.

The frequency of the clock may be the same for all the clock pins 13. For example, the clock frequency of all the clock pins is collectively determined by using the setting terminals C1 and C2. The frequency is determined by a combination of a plurality of setting terminals, so that the frequency can be set by a small number of terminals. An example of the relationship between a combination of input levels of the setting terminals C1 and C2 and the frequency is as follows: When (setting terminal C2, setting terminal C1) is (low, low), the frequency is 12 MHz, when (setting terminal C2, setting terminal C1) is (low, high), the frequency is 24 MHz, when (setting terminal C2, setting terminal C1) is (high, low), the frequency is 30 MHz, and when (setting terminal C2, setting terminal C1) is (high, high), the frequency is 48 MHz.

Other than the above, as a method for setting the clock frequency, the clock frequency may be set by a storage device such as a register, or may be set by a command such as the port power enable request from the USB host.

As described above, in the present embodiment, in the same manner as in the first and the second embodiments, the USB hub controls the clock supplied to the USB peripheral device, so that the power consumption can be reduced and the frequency of the clock to be supplied can be set. Thereby it is possible to flexibly select a clock according to the specification of the peripheral device.

The present invention is not limited to the above embodiments, but can be appropriately modified without departing from the scope of the invention. For example, although, in the above examples, the USB host and the USB peripherals are connected by one USB hub, a plurality of USB hubs may be cascaded. In this case, an upstream device and a downstream device can be a USB hub.

The clock supply may be stopped according to the USB peripheral device. For example, the clock supply is not stopped in the case of a device which may be subject to malfunction or difficult to be restarted once the clock supply is stopped, and the clock supply may be stopped only in the case of a device which can operate normally even if the clock supply is stopped.

What is claimed is:

1. A USB (Universal Serial Bus) hub comprising:
an upstream USB port connecting to an upstream device via an upstream USB line;
a downstream USB port connecting to a downstream device via a downstream USB line;
a clock generation circuit supplying a clock;
a clock pin that supplies the clock received from the clock generation circuit for operating the downstream device to the downstream device; and
a hub controller that automatically stops clock supply to the downstream device via the clock generation circuit and the clock pin, both when a connection between the upstream USB port and the upstream device is disconnected and when the hub controller receives a power save mode request to the downstream USB port from the upstream device,
wherein the hub controller stops the clock supply whenever a stop of the data communication between the upstream device and the downstream device is detected by the hub controller including when the hub controller receives the power save mode request to the downstream USB port from the upstream device to stop the data communication, wherein when stopping the clock, the hub controller instructs the clock generation circuit to stop the clock supply and the clock generation circuit stops the clock supply from all the clock pins, and wherein the hub controller turns on a power line included in the downstream USB line and starts the clock supply to the downstream device when the upstream USB port and the upstream device are connected.

2. The USB hub according to claim 1, wherein the hub controller stops the clock supply to the downstream device when a power line included in the upstream USB line is off, and wherein the hub controller stops the clock supply whenever the stop of the data communication between the upstream device and the downstream device is detected by the hub controller when the upstream device is disconnected and whenever the hub controller receives the power save mode request.

3. The USB hub according to claim 1, wherein the hub controller stops the clock supply to the downstream device when the downstream device goes into a power save mode, and wherein the hub controller automatically stops the clock supply according to a state of the upstream device and a state of the downstream device.

4. The USB hub according to claim 1, wherein when the connection between the upstream USB port and the upstream device is disconnected, the hub controller turns off a power line included in the downstream USB line and stops the clock supply to the downstream device.

5. The USB hub according to claim 4, wherein the hub controller stops the clock supply to the downstream device after the hub controller turns off the power line included in the downstream USB line.

6. The USB hub according to claim 1, further comprising:
a plurality of the downstream USB ports connecting to a plurality of the downstream devices respectively,
wherein the hub controller stops the clock supply to the plurality of the downstream devices.

7. The USB hub according to claim 1, further comprising:
a plurality of the downstream USB ports connecting to a plurality of the downstream devices respectively,
wherein the hub controller stops the clock supply to a part of the plurality of the downstream devices.

8. The USB hub according to claim 1, wherein the hub controller starts the clock supply to the downstream device when the upstream USB port and the upstream device are connected.

9. The USB hub according to claim 8, wherein the hub controller starts the clock supply to the downstream device after turning on the power line included in the downstream USB line.

10. The USB hub according to claim 8, further comprising:
a plurality of the downstream USB ports connecting to a plurality of the downstream devices respectively,
wherein the hub controller starts the clock supply to the plurality of the downstream devices.

11. The USB hub according to claim 8, further comprising:
a plurality of the downstream USB ports connecting to a plurality of the downstream devices respectively,
wherein the hub controller starts the clock supply to a part of the plurality of the downstream devices.

12. The USB hub according to claim 1, wherein the hub controller starts the clock supply to the downstream device when the hub controller receives a power enable request to the downstream USB port from the upstream device.

13. The USB hub according to claim 1, wherein the hub controller starts the clock supply to the downstream device when the hub controller receives a power save mode cancel request to the downstream USB port from the upstream device.

14. The USB hub according claim 1, wherein the hub controller can set a clock frequency of the clock supplied to the downstream device.

15. The USB hub according to claim 14, further comprising:
a clock frequency setting terminal for setting the clock frequency,
wherein the hub controller sets the clock frequency according to a voltage level of the clock frequency setting terminal.

16. The USB hub according to claim 15, further comprising:
a plurality of the clock frequency setting terminals,
wherein the hub controller sets the clock frequency according to a combination of voltage levels of the plurality of the clock frequency setting terminals.

17. The USB hub according to claim 14, further comprising:
a plurality of the clock pins that supply a plurality of clocks including the clock to a plurality of the downstream devices, respectively,
wherein the hub controller sets the plurality of clocks supplied to the downstream devices to the same frequency.

18. The USB hub according to claim 14, further comprising:
a plurality of the clock pins that supply a plurality of the clocks to a plurality of the downstream devices, respectively,
wherein the hub controller sets frequencies of the plurality of the clocks supplied to the downstream devices independently from each other.

19. A control method of a USB (Universal Serial Bus) hub connected between an upstream device and a downstream device, the control method comprising:
supplying a clock, for operating the downstream device, from the USB hub; and
automatically stopping clock supply to the downstream device whenever a data communication between the downstream device and the upstream device is stopped including when a hub controller receives a suspend request to a downstream USB port from the upstream device to stop the data communication,
wherein when stopping the clock, the hub controller instructs a clock generation circuit to stop the clock supply and the clock generation circuit stops the clock supply from all clock pins providing the clock to the downstream device,
wherein an upstream USB port connects to the upstream device via an upstream USB line,
wherein the downstream USB port connects to the downstream device via a downstream USB line, and
wherein the hub controller turns on a power line included in the downstream USB line and starts the clock supply to the downstream device when the upstream USB port and the upstream device are connected.

* * * * *